(12) United States Patent
Ranieri

(10) Patent No.: US 6,925,720 B2
(45) Date of Patent: Aug. 9, 2005

(54) HACKSAW WITH BLADE TENSION ADJUSTMENT MECHANISM

(75) Inventor: Eric Ranieri, West Hartford, CT (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 10/647,530

(22) Filed: Aug. 26, 2003

(65) Prior Publication Data
US 2005/0044731 A1 Mar. 3, 2005

(51) Int. Cl.$^7$ ................................. B27B 21/06
(52) U.S. Cl. ..................... 30/513; 30/125; 30/507
(58) Field of Search .................. 30/514, 513, 509, 30/507, 125

(56) References Cited

U.S. PATENT DOCUMENTS

| | | | |
|---|---|---|---|
| 925,112 A | * | 6/1909 | Leland ........................ 30/513 |
| 2,546,660 A | | 3/1951 | Wilcox |
| 3,327,748 A | | 6/1967 | Reuterfors |
| 3,636,997 A | | 1/1972 | Keymer |
| 4,349,059 A | | 9/1982 | Hepworth et al. |
| 4,367,779 A | | 1/1983 | Ewig |
| 4,466,471 A | | 8/1984 | Thomson |
| 5,074,002 A | | 12/1991 | Huang |
| 5,471,752 A | | 12/1995 | Koetsch |
| 5,706,585 A | | 1/1998 | Wang |
| 5,768,788 A | | 6/1998 | Arnold |
| 6,070,330 A | | 6/2000 | Phelon et al. |
| 6,079,109 A | | 6/2000 | Ranieri |
| 6,134,791 A | * | 10/2000 | Huang ........................ 30/513 |
| 6,266,887 B1 | | 7/2001 | Owens et al. |

FOREIGN PATENT DOCUMENTS

DE    202 05 031 U    8/2002

* cited by examiner

Primary Examiner—Douglas D Watts
(74) Attorney, Agent, or Firm—Pillsbury Winthrop Shaw Pittman LLP

(57) ABSTRACT

A hacksaw includes an elongated blade, a frame, and a blade tension adjustment mechanism. The blade tension adjustment mechanism includes a lever constructed and arranged to be pivotally moved between (1) a blade tensioning position so as to tension the blade, and (2) a blade releasing position so as to release the tension from the blade and thereby allow removal and replacement of the blade. A lock is slidably attached to the lever to slide between (1) a locked position wherein the lock secures the lever in the blade tensioning position, and (2) an unlocked position wherein the lock permits the lever to be pivoted between the blade tensioning position and the blade releasing position.

37 Claims, 16 Drawing Sheets

HACKSAW WITH BLADE TENSION ADJUSTMENT MECHANISM

FIELD OF THE INVENTION

The present invention relates to hacksaws.

BACKGROUND AND SUMMARY OF THE INVENTION

Known hacksaws have a rigid frame, a handle member secured to a rearward end of the frame, and a blade tensioning device located below the handle member. One end of a cutting blade is removably mounted to a forward end of the frame and the other end is removably mounted to the blade tensioning device.

In some arrangements, the blade tensioning device is a pivotally mounted lever which the user pivots upwardly to tension the blade. Examples of such blade tensioning devices are disclosed in U.S. Pat. Nos. 2,546,660 and 6,079,109. In the '660 patent, the lever is secured in its tensioning position by the tension in the saw blade. In the '109 patent, the lever is self-locking, by moving above the axis of the blade when in the tensioning position.

One aspect of the present invention is to provide an improved blade tensioning device having a lever and a lock that prevents inadvertent pivotal movement of the lever out of its tensioning positioning.

In accordance with the principles of the present invention, this aspect may be achieved by providing a hacksaw comprising: an elongated blade having opposing longitudinal end portions with a cutting edge between the longitudinal end portions; a frame including a forward portion providing a first blade mount, one of the longitudinal end portions of the blade being removably mounted on the first blade mount, a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and an intermediate portion interconnecting the forward end portion and the rearward portion; and a blade tension adjustment mechanism provided at the rearward portion. The blade tension adjustment mechanism includes a second blade mount configured to removably mount the other of the longitudinal end portions of the blade, a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade, and a lock slidably attached to the lever to slide between (1) a locked position wherein the lock secures the lever in the blade tensioning position, and (2) an unlocked position wherein the lock permits the lever to be pivoted relative to the handle portion between the blade tensioning position and the blade releasing position.

It is known to provide a hacksaw with a holder for holding a spare blade. For example, U.S. Pat. No. 3,327,748 discloses a hacksaw having a blade holder attached to opposing flanges of the frame's I-shaped body portion for securing a spare blade within the opposing flanges.

Another aspect of the present invention is to provide an improved structure for storing spare blades on a hacksaw.

In accordance with the principles of the present invention, this aspect may be achieved by providing a hacksaw comprising: an elongated blade having opposing longitudinal end portions with a cutting edge between the longitudinal end portions; a frame including a forward portion providing a first blade mount, one of the longitudinal end portions of the blade being removably mounted on the first blade mount, a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and an intermediate portion interconnecting the forward portion and the rearward portion; a blade tension adjustment mechanism mounted to the adjustment mechanism mounting structure of the rearward portion, the blade tension adjustment mechanism providing a second blade mount configured to removably mount the other of the longitudinal end portions of the blade; and a blade holder releasably attached to the intermediate portion of the frame. The blade holder has a spring loaded member structured to releasably secure one or more spare blades to the intermediate portion of the frame.

These and other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
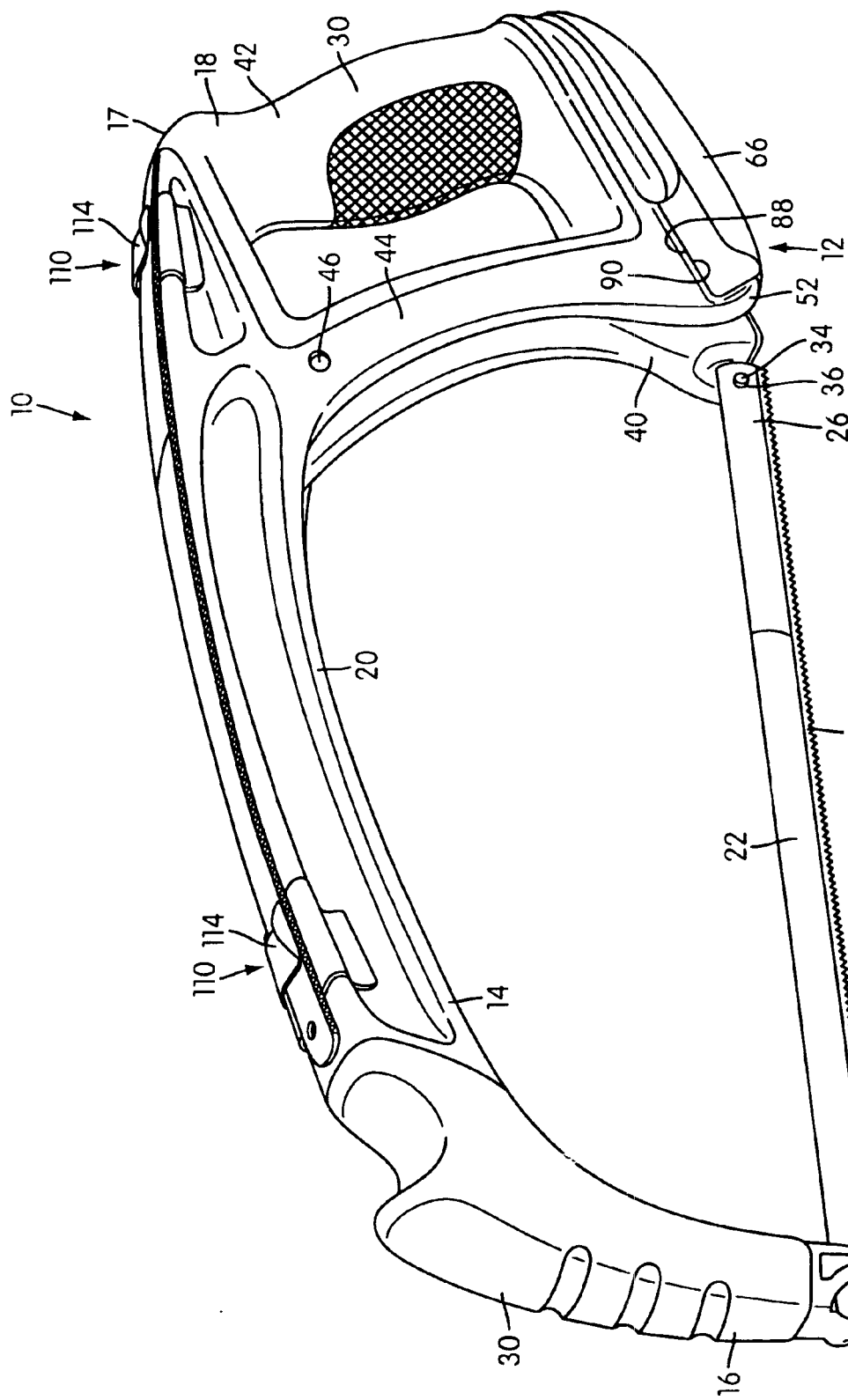
FIG. 1 is a perspective view of a hacksaw having a blade tension adjustment mechanism constructed in accordance with an embodiment of the invention.

FIG. 1 illustrates a hacksaw 10 having a blade tension adjustment mechanism 12 constructed in accordance with one illustrated embodiment of the present invention. In the illustrated embodiment, the hacksaw 10 includes a rigid frame 14, e.g., formed of metal, having a forward portion 16, a rearward portion 17 including a manually engageable handle portion 18, and an intermediate portion 20 that interconnects the forward end portion 16 and the rearward portion 17. The blade tension adjustment mechanism 12 is mounted below the handle portion 18 of the rearward portion 17. An elongated blade 22 (e.g., serrated cutting blade), having opposing longitudinal end portions 24, 26 with a cutting edge 28 between the longitudinal end portions 24, 26, has one end portion 24 removably mounted to the forward portion 16 of the frame 14 and the other end portion 26 removably mounted to the blade tension adjustment mechanism 12 adjacent the handle portion 18. The handle portion 18 is constructed and arranged to be manually grasped to enable performance of a cutting operation wherein the cutting edge 28 of the blade 22 is engaged with a workpiece and moves forwardly and rearwardly to cut the workpiece.

Portions of the frame 14 may be overmolded with a plastic material to protect and reinforce the same. For example, as shown in FIG. 1, the handle portion 18 and the forward portion 16 of the frame 14 are overmolded with a plastic material 30 to provide impact protection and facilitate gripping of the hacksaw 10 in use.

In the illustrated embodiment, the frame 14, including the forward portion 16, rearward portion 17 including handle portion 18, and intermediate portion 20, is integrally formed in one piece by any suitable method (e.g., molding). However, the portions 16, 17, and 20 of the frame 14 may be constructed separately and rigidly connected to one another in any suitable manner.

Figure 2:
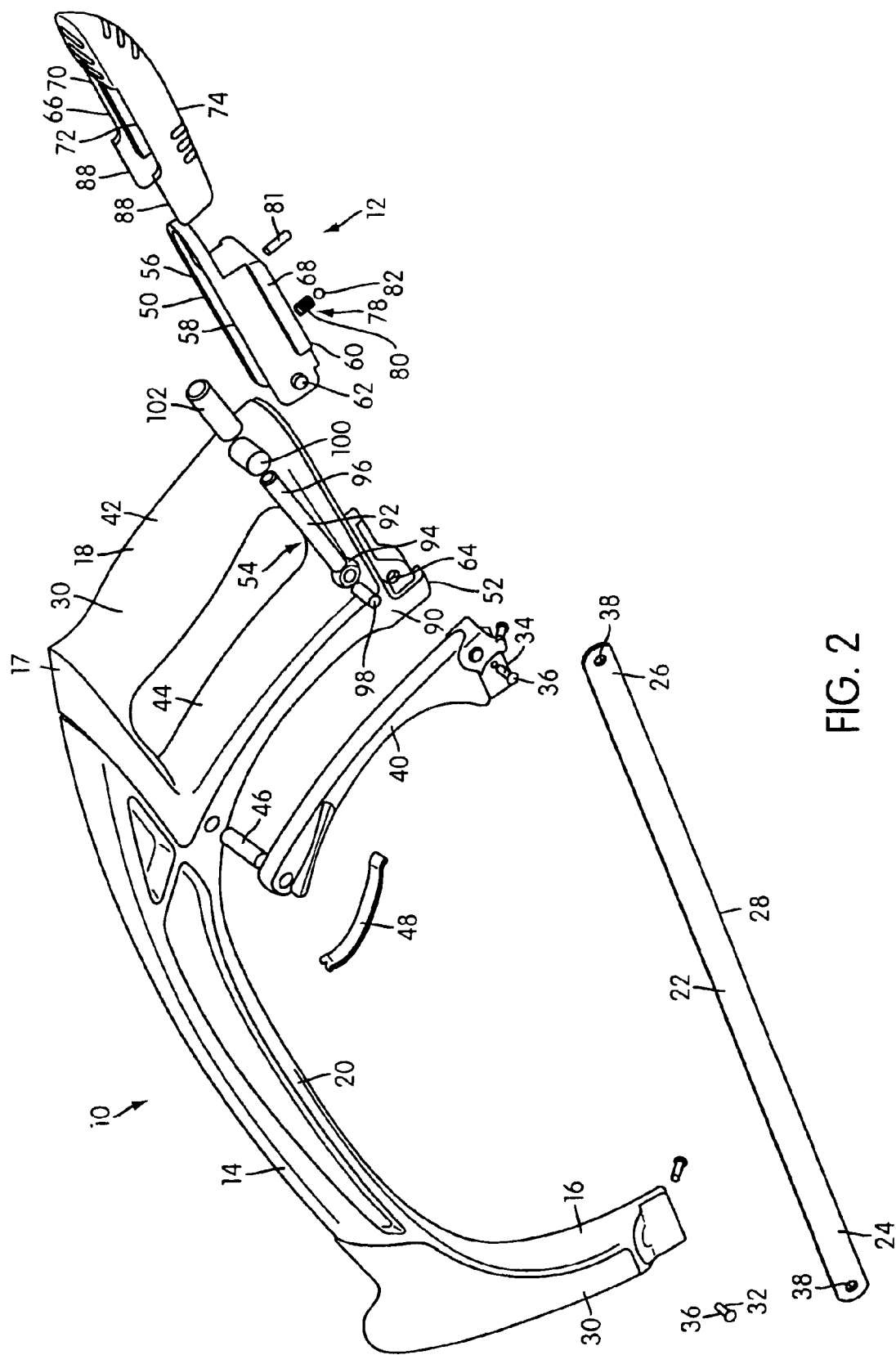
FIG. 2 is an exploded view of the hacksaw shown in FIG. 1.
Figure 3:
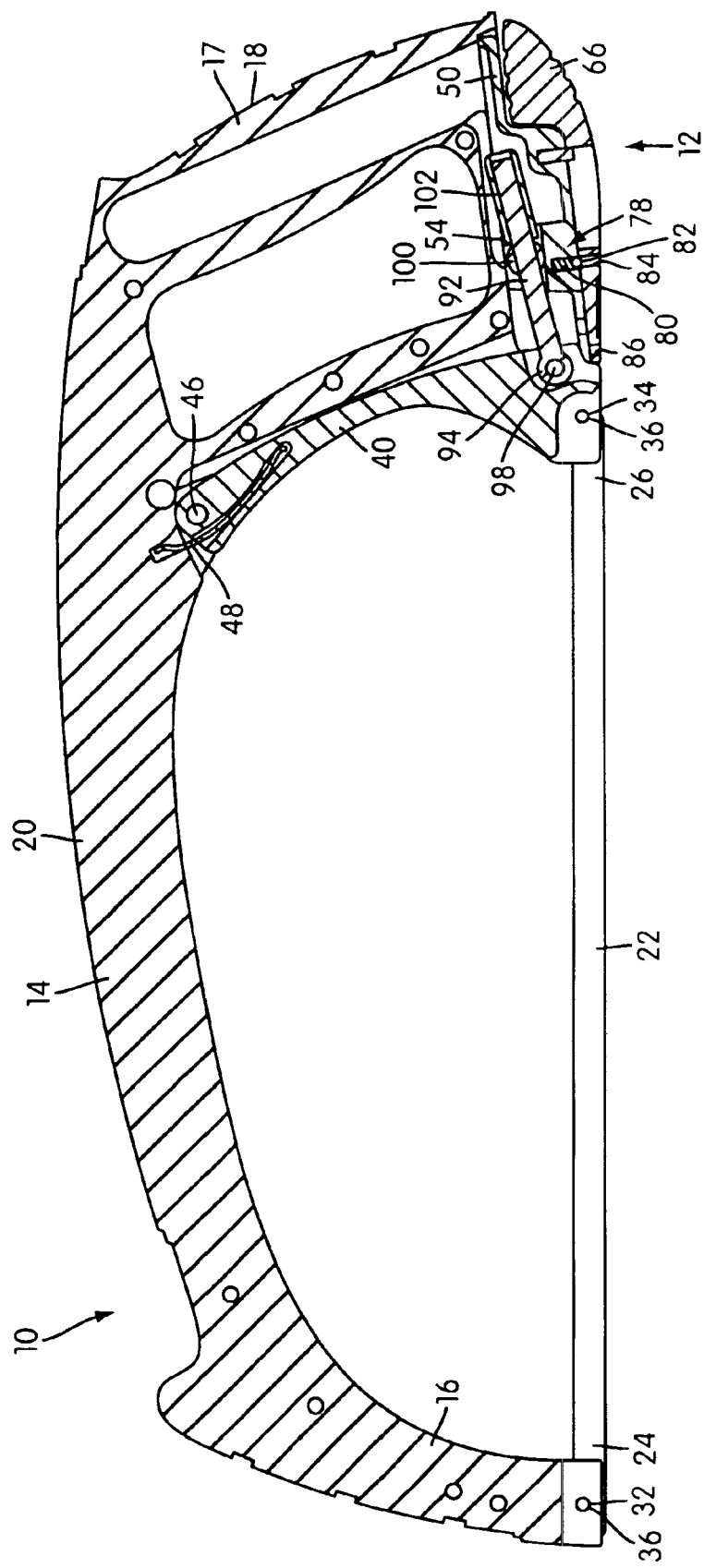
FIG. 3 is a cross-sectional view illustrating the blade tension adjustment mechanism shown in FIG. 1.

As shown in FIGS. 1 and 2, the forward portion 16 of the frame 14 provides a first blade mount 32 and the blade tension adjustment mechanism 12 provides a second blade mount 34. One of the longitudinal end portions 24 of the blade 22 is removably mounted on the first blade mount 32 and the other of the longitudinal end portions 26 of the blade 22 is removably mounted on the second blade mount 34. The blade tension adjustment mechanism 12 is provided to tension the blade 22 after it has been mounted on the first and second blade mounts 32, 34 and to release tension from the blade 22 for removal and replacement of the blade 22.

In the illustrated embodiment, the first and second blade mounts 32, 34 each include a post 36 and the longitudinal end portions 24, 26 of the blade 22 each have an aperture 38 formed therethrough. The blade 22 is removably mounted to the first and second blade mounts 32, 34 by inserting the posts 36 through respective apertures 38. Then, the user moves the first and second blade mounts 32, 34 relative to one another by manually operating the blade tension adjustment mechanism 12 to tension the blade 22.

As shown in FIGS. 1 and 2, the post 36 of the first blade mount 32 is provided adjacent the free end of the forward portion 16 of the frame 14. The post 36 of the second blade mount 34 is provided on an elongated spring biased arm 40. The arm 40 has one end pivotally mounted to the frame 14 and an opposite end that provides the post 36. That is, the handle portion 18 of the frame 14 includes a handle member 42 and a guard member 44, the guard member 44 protecting the user's hand in use. The guard member 44 includes a recess structured to receive the arm 40 therein. The arm 40 is pivotally mounted to an upper portion of the guard member 44 by a pin 46. A spring 48 is mounted between the arm 40 and the guard member 44 to maintain the arm 40 in generally parallel relation with the guard member 44 when no force is applied thereto. The arm 40 is pivotable to move the second blade mount 34 towards and away from the first blade mount 32 against biasing from the spring 48.

Figure 8:
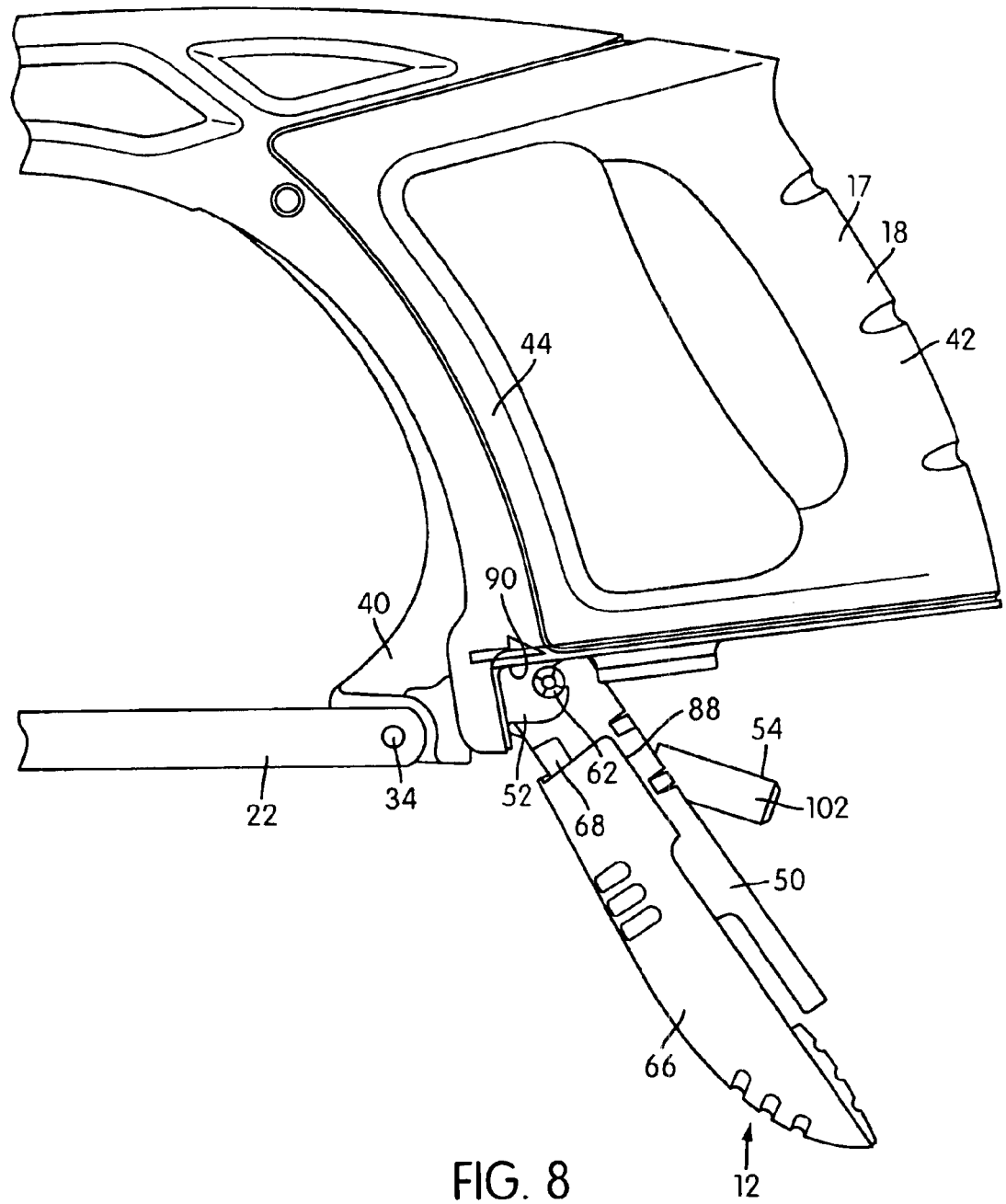
FIG. 8 is a side view of the blade tension adjustment mechanism shown in FIG. 1, the lock of the adjustment mechanism in an unlocked position and the lever in a blade releasing position.
Figure 9:
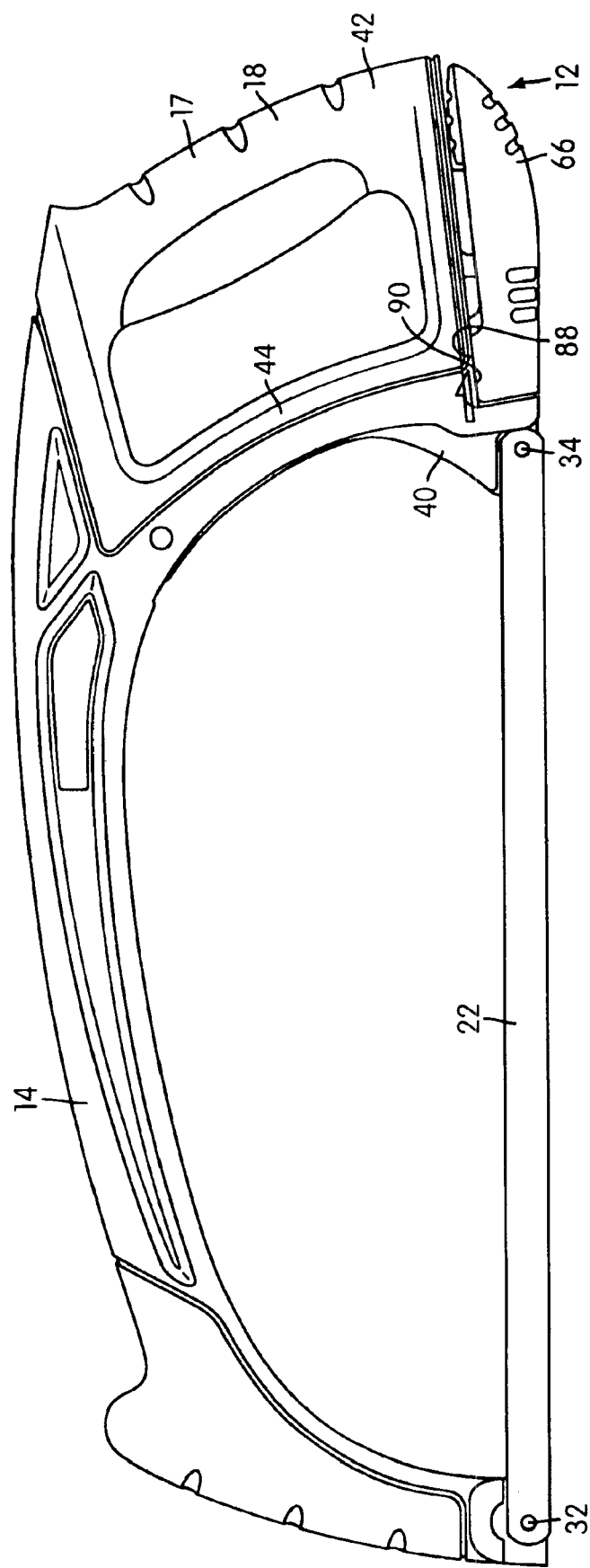
FIG. 9 is a side view of the hacksaw shown in FIG. 1 with portions of the blade tension adjustment mechanism in phantom, the lock of the adjustment mechanism in a locked position and the lever in a blade tensioning position.
Figure 10:
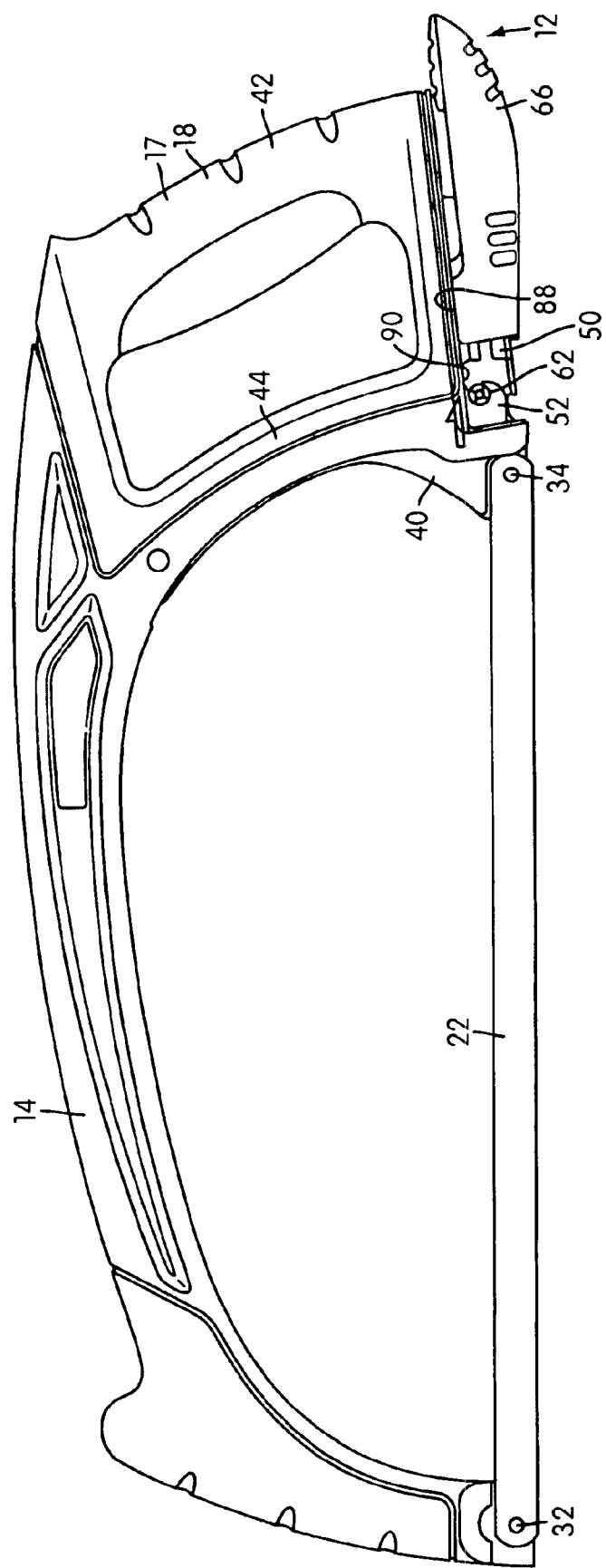
FIG. 10 is a side view of the hacksaw shown in FIG. 1 with portions of the blade tension adjustment mechanism in phantom, the lock of the adjustment mechanism in an unlocked position and the lever in a blade tensioning position.
Figure 12:
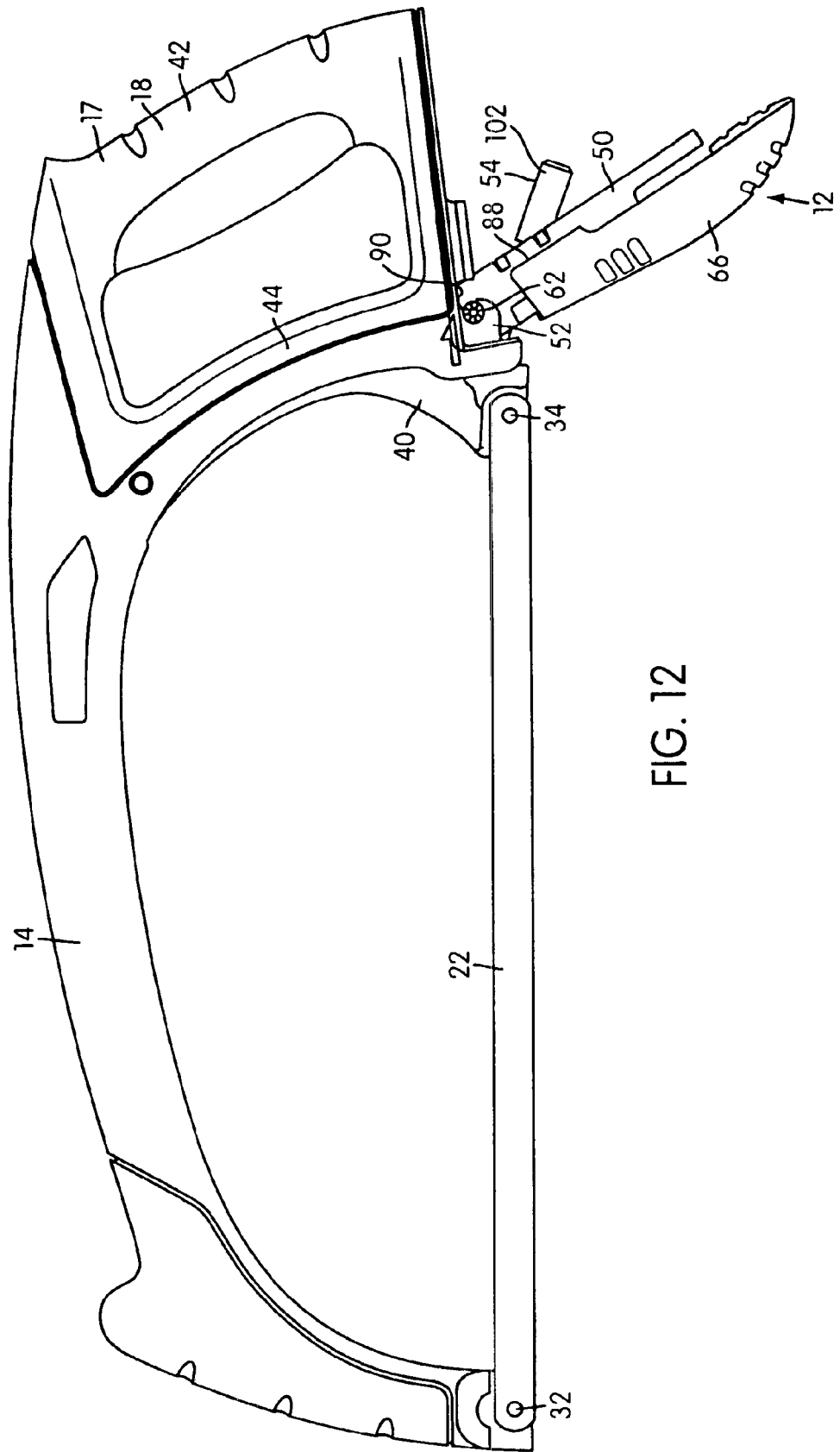
FIG. 12 is a side view of the hacksaw shown in FIG. 1 with portions of the blade tension adjustment mechanism in phantom, the lock of the adjustment mechanism in an unlocked position and the lever in a blade releasing position.

The blade tension adjustment mechanism 12 includes a lever 50 operatively connected to the arm 40. Specifically, the lever 50 is pivotally mounted to an adjustment mechanism mounting structure 52 provided below the handle portion 18. The lever 50 is constructed and arranged to be pivotally moved between a blade tensioning position (as shown in FIGS. 3, 6, 7, 9, and 10) wherein the first and second blade mounts 32, 34 are moved relative to one another so as to tension the blade 22 between the first and second blade mounts 32, 34 and a blade releasing position (as shown in FIGS. 8 and 12) wherein the first and second blade mounts 32, 34 are moved relative to one another so as to release the tension from the blade 22 and thereby allow removal and replacement of the blade 22.

An adjusting member 54 is mounted between the lever 50 and the arm 40, as shown in FIGS. 2–5. The adjusting member 54 is constructed and arranged to selectively move the arm 40 relative to the lever 50 so that the tension of the blade 22 can be selectively adjusted, as will be further discussed below.

Figure 4:
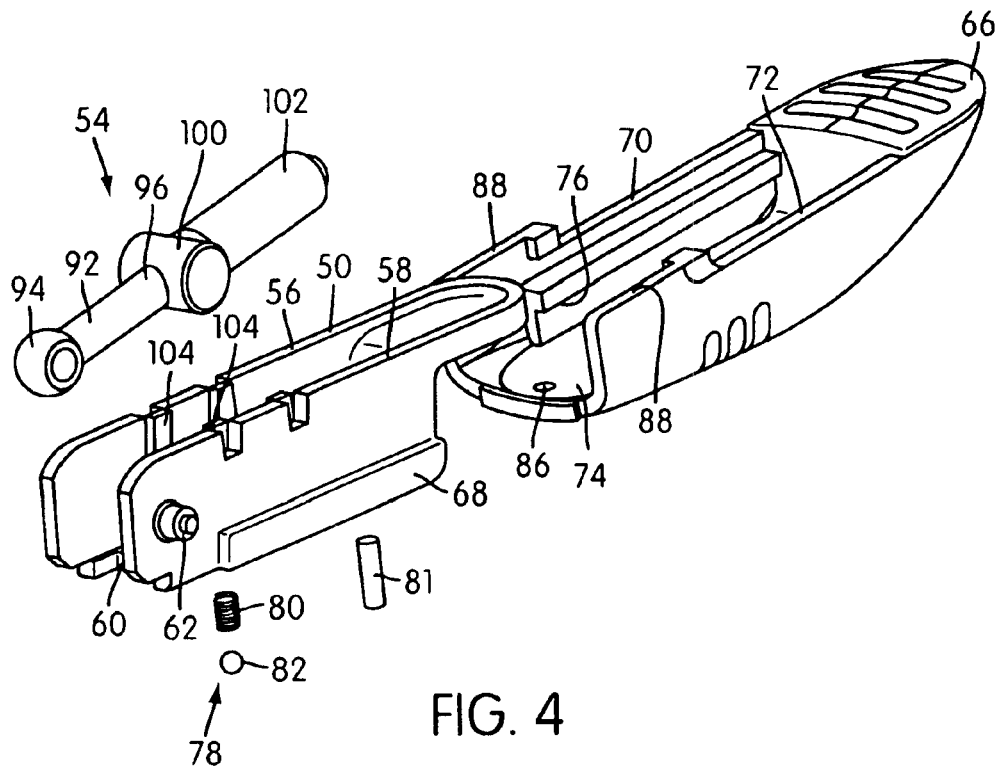
FIG. 4 is an exploded view of the blade tension adjustment mechanism shown in FIG. 1.
Figure 5:
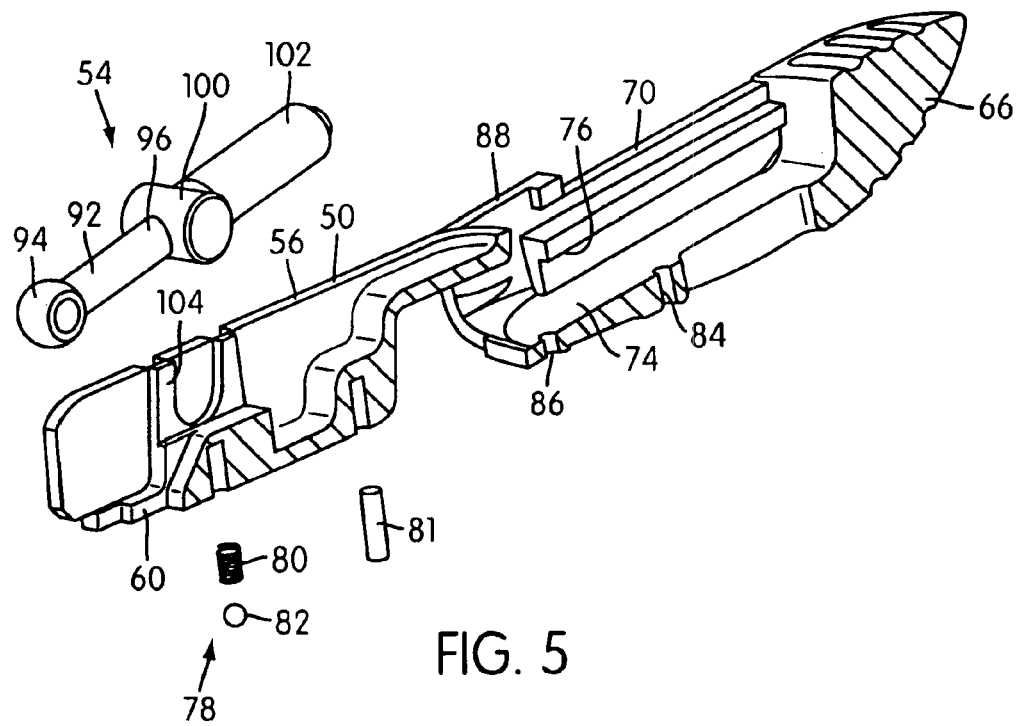
FIG. 5 is a partial cross-sectional view illustrating the blade tension adjustment mechanism shown in FIG. 1.

As shown in FIGS. 2, 4, and 5, the lever 50 includes generally parallel walls 56, 58 interconnected by a transverse wall 60 defining a U-shaped cross-sectional configuration. The walls 56, 58 provide forwardly disposed mounting portions provided with projections 62. The adjustment mechanism mounting structure 52 includes a pair of recesses 64 formed on a pair of transversely spaced side walls. The projections 62 of the lever 50 are pivotally received in the recesses 64 of the mounting structure 52 to allow for pivotal movement of the lever 50 with respect to the handle portion 18 of the frame 14.

FIGS. 13–18 illustrate another embodiment in which the mounting structure 52 is provided with a pair of projections 162 and the walls of the lever 50 are provided with recesses 164 structured to receive respective projections 162 provided on the mounting structure 52 to allow for pivotal movement of the lever 50. It should be understood that the lever 50 may be pivotally mounted to the frame 14 in any other suitable manner.

A lock 66 is slidably attached to the lever 50 to slide between a locked position (as shown in FIGS. 1, 3, 6, and 9) wherein the lock 66 secures the lever 50 in the blade tensioning position, and an unlocked position (as shown in FIGS. 7, 8, and 10–12) wherein the lock 66 permits the lever 50 to be pivoted relative to the rearward portion 17 between the blade tensioning position and the blade releasing position.

Specifically, the lever 50 includes a track portion, in the form of protrusions 68, on opposing walls 56, 58 thereof. The lock 66 includes generally parallel walls 70, 72 interconnected by a transverse wall 74 defining a U-shaped cross-sectional configuration. The walls 70, 72 of the lock 66 each have an elongated recess 76 on an inner surface thereof. The protrusions 68 of the lever 50 are received within corresponding recesses 76 provided on the lock 66 to allow the lock 66 to slide along the lever 50 between locked and unlocked positions.

Figure 14:
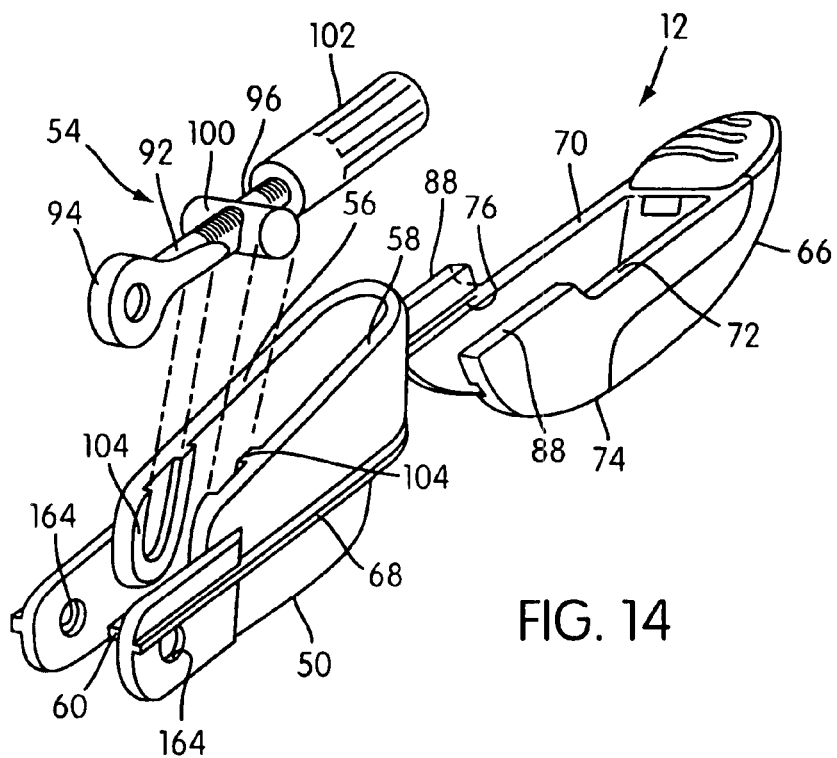
FIG. 14 is an exploded view of the blade tension adjustment mechanism shown in FIG. 13.

As shown in FIGS. 2 and 4, the protrusions 68 and recesses 76 of the lever 50 and lock 66 are provided on lower edge portions of the walls thereof. Alternatively, as shown in FIG. 14, the protrusions 68 and recesses 76 of the lever 50 and lock 66 may be provided on intermediate portions of the walls thereof. However, the lock 66 may be slidably mounted to the lever 50 in any other suitable manner.

In the illustrated embodiment, the lever 50 and lock 66 are formed of aluminum by an injection molding process. Also, the lock 66 is overmolded with a plastic material, such as polypropylene, to facilitate gripping of the lock 66 in use and to provide impact protection if the hacksaw 10 is dropped by the user. However, the lever 50 and lock 66 may be formed of any suitable material by any suitable process.

A biasing structure 78 is mounted between the lever 50 and the lock 66 to positively locate the lock 66 in its locked and unlocked positions. As shown in FIGS. 2–5, the biasing structure 78 includes a spring 80 attached to the lever 50 that is operatively engaged with a ball 82 so as to bias the ball 82 into engagement with the lock 66. The lock 66 includes first and second recesses 84, 86 (see FIG. 5). In use, the ball 82 is biased into engagement with the lock 66 such that the ball 82 engages within the first recess 84 provided in the lock 66 to maintain the lock 66 in the locked position and engages within the second recess 86 provided in the lock 66 to maintain the lock 66 in the unlocked position. The user applies sufficient force to the lock 66 to force the ball 82 out of the respective recess 84, 86 against biasing from the spring 80 to move the lock 66 between its locked and unlocked positions. Also, a pin 81 is attached to the lever 50 and extends through an opening in the lock 66 to provide a hard stop for the lock 66 to limit its range of sliding movement.

Figure 13:
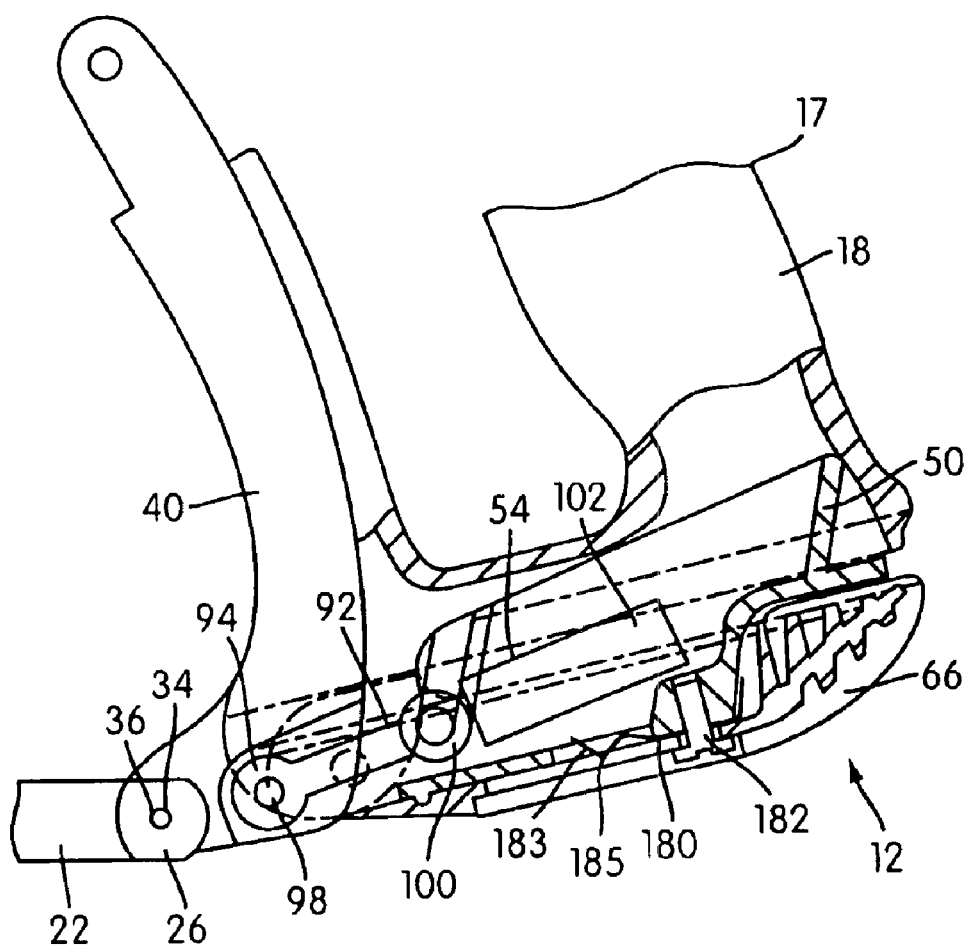
FIG. 13 is a cross-sectional view illustrating another embodiment of the blade tension adjustment mechanism.
Figure 15:
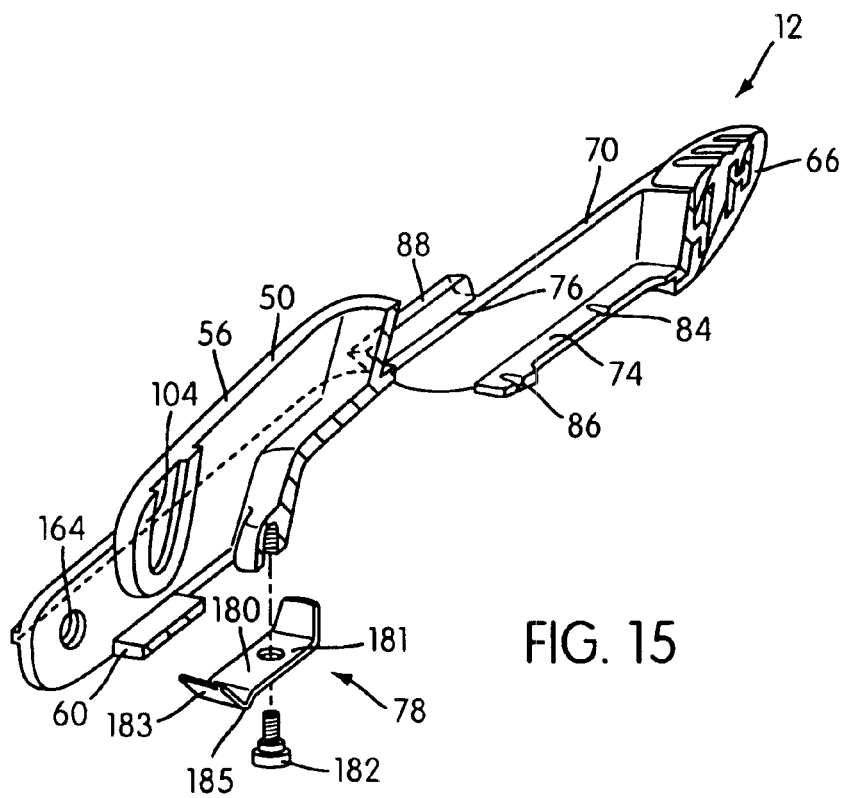
FIG. 15 is a partial cross-sectional view illustrating the blade tension adjustment mechanism shown in FIG. 13.
Figure 16:
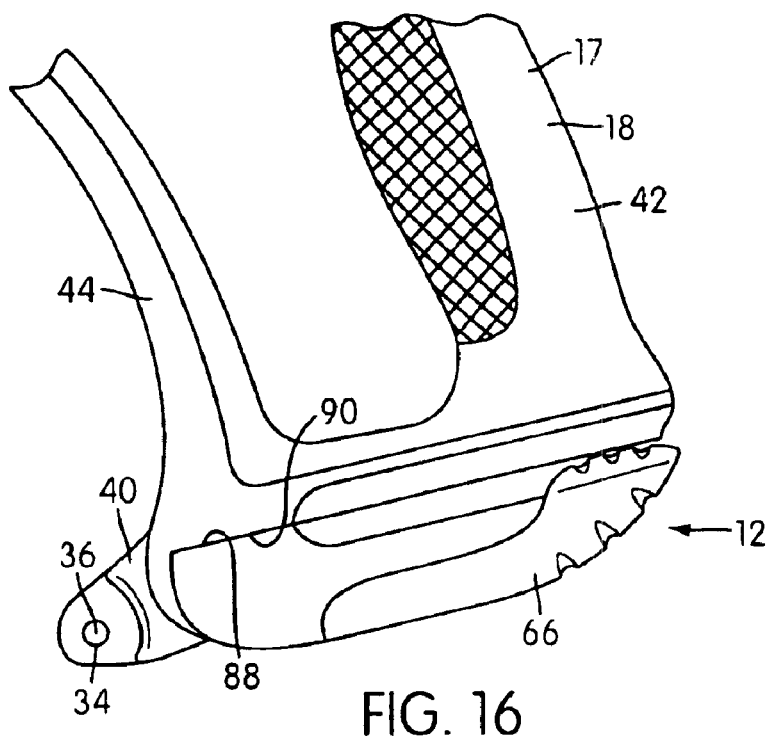
FIG. 16 is a side view of the blade tension adjustment mechanism shown in FIG. 13, the lock of the adjustment mechanism in a locked position and the lever in a blade tensioning position.

FIGS. 13 and 15 illustrate another embodiment of the biasing structure 78. As illustrated, the biasing structure 78 includes a spring member 180 having an intermediate elongated portion 181 secured to the lever 50 by a fastener 182. The spring member 180 has a bent end portion 183 including a protruding tip 185 that is biased into engagement with the lock 66. The lock 66 includes first and second recesses 84, 86. In use, the tip 185 of the spring member 180 is biased into engagement with the lock 66 such that the tip 185 engages within the first recess 84 provided in the lock 66 to maintain the lock 66 in the locked position and engages within the second recess 86 provided in the lock 66 to maintain the lock 66 in the unlocked position.

Figure 6:
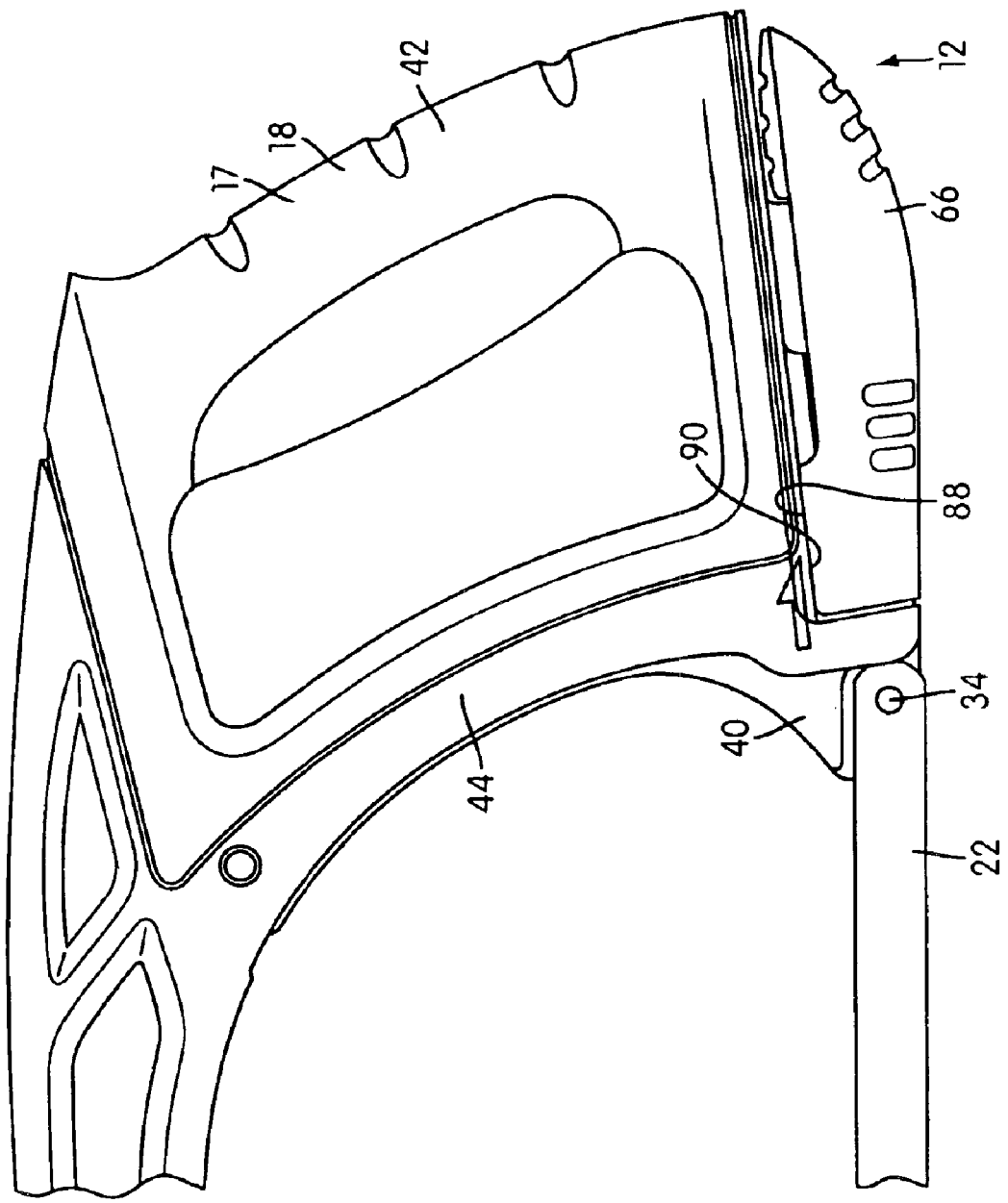
FIG. 6 is a side view of the blade tension adjustment mechanism shown in FIG. 1, the lock of the adjustment mechanism in a locked position and the lever in a blade tensioning position.
Figure 7:
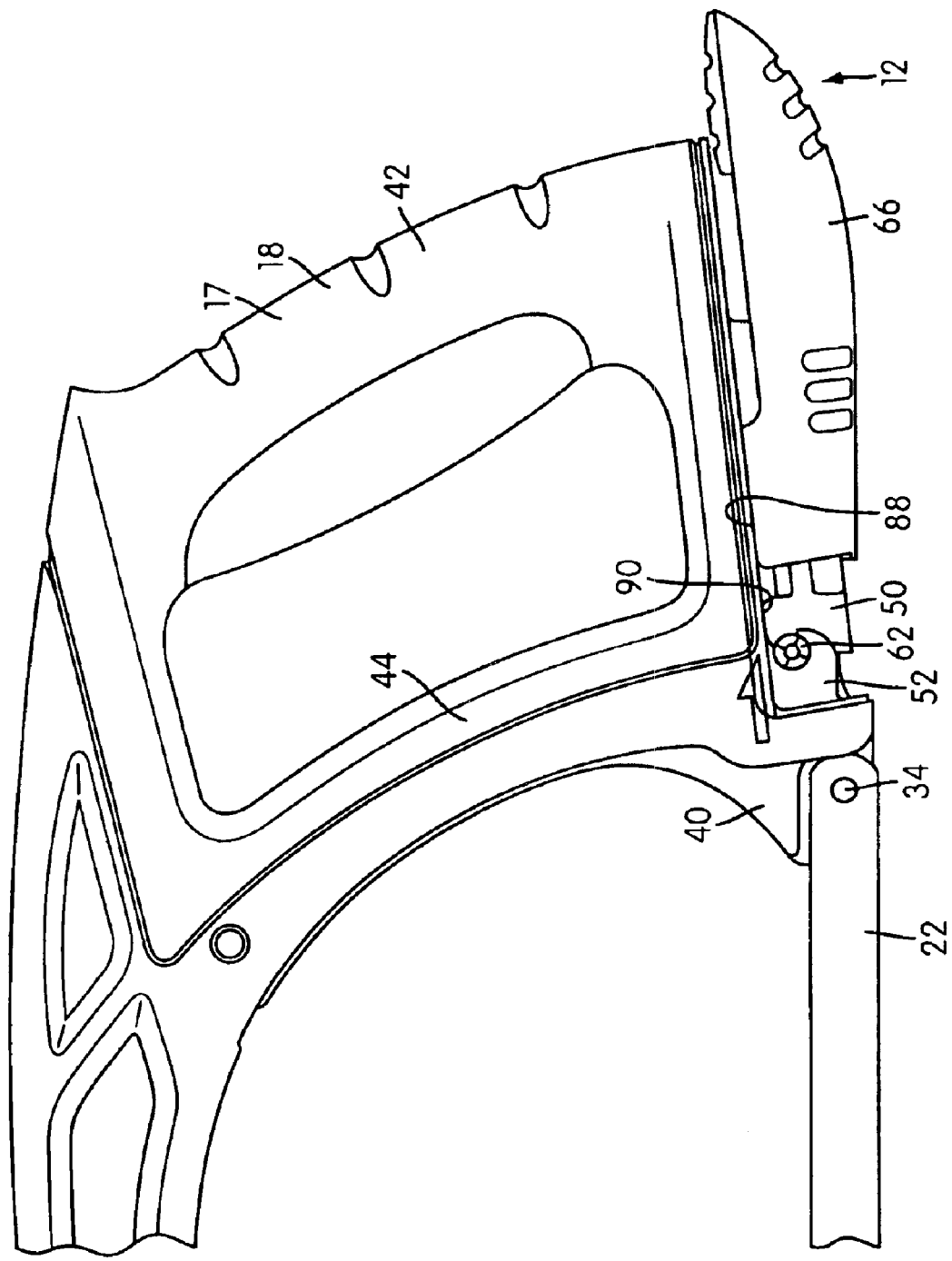
FIG. 7 is a side view of the blade tension adjustment mechanism shown in FIG. 1, the lock of the adjustment mechanism in an unlocked position and the lever in a blade tensioning position.

As best shown in FIGS. 4 and 6–12, the walls 70, 72 of the lock 66 each include a generally upwardly facing engagement surface 88 at forward ends thereof. Also, the lower end of the handle portion 18 of the frame 14 includes generally downwardly facing engagement surfaces 90 provided on opposing side walls of the handle portion 18 adjacent the adjustment mechanism mounting structure 52. When the lever 50 is in the blade tensioning position and the lock 66 is in the locked position, as shown in FIG. 6, the engagement surfaces 88 of the lock 66 are in abutting engagement with the engagement surfaces 90 of the handle portion 18 of the frame 14. As a result, pivotal movement of the lever 50 out of the blade tensioning position is prevented because the lock 66 is prevented from movement with respect to the frame 14. The lock 66 must be slid from the locked position to the unlocked position to disengage the engagement surfaces 88 of the lock 66 from the engagement surfaces 90 of the handle portion 18 to allow pivotal movement of the lever 50 and lock 66 with respect to the frame 14.

The adjusting member 54 is constructed and arranged to selectively move the second blade mount 34 relative to the lever 50 so as to selectively adjust the amount of tension being applied to the blade 22 when the lever 50 is in the blade tensioning position thereof. Specifically, as shown in FIGS. 2–5, the adjusting member 54 includes an elongated shaft 92 having a forward mounting portion 94 and a rearward threaded portion 96. The mounting portion 94 of the shaft 92 is attached to the arm 40 pivotally attached to the frame 14. That is, a pin 98 extends through a recess provided in the arm 40 and a recess provided in the mounting portion 94 of the shaft 92 so as to couple the shaft 92 and the arm 40.

A pin 100, having an opening therethrough, is slidably engaged with the threaded portion 96 of the shaft 92. Specifically, the threaded portion 96 of the shaft 92 is inserted through the opening provided in the pin 100. A manually engagable knob 102 having an internally threaded bore is threadably engaged with the threaded portion 96 of the shaft 92. As a result, the knob 102 may be rotated to adjust its position on the shaft 92.

A shown in FIGS. 4 and 5, each of the opposing side walls 56, 58 of the lever 50 include an arcuate shaped supporting structure 104 that is adapted to support the adjusting member 54. Specifically, ends of the pin 100 are engaged within the respective supporting structures 104 of the lever 50. As a result, the adjusting member 54 is mounted between the arm 40 and the lever 50. The adjusting member 54 can be selectively manually adjusted to adjust the distance between the arm 40 and lever 50 and hence adjust the amount of tension being applied to the blade 22. That is, the knob 102 can be manually rotated to adjust its position on the shaft 92, which adjusts the position of the pin 100 on the shaft 92, thereby adjusting the distance between the arm 40 and the lever 50.

In use, when the blade 22 is mounted on the first and second blade mounts 32, 34 and the lever 50 is in the blade tensioning position, tension from the blade 22 is transferred from the arm 40 to the adjusting member 54, from the adjusting member 54 to the lever 50, and from the lever 50 to the frame 14. The amount of relative movement permitted between the first and second blade mounts 32, 34 determines the amount of tension applied to the blade 22. The specific amount of relative movement permitted can be adjusted by adjusting the knob 102 of the adjusting member 54.

The bottom of the handle portion 18 of the frame 14 has a cavity that is structured to receive at least an upper portion of the lever 50 when the lever 50 is in the blade tensioning position. Thus, when the lever 50 is moved to the blade tensioning position, there is no risk of the user being pinched by an autolocking force in which the adjusting member 54 forces the lever 50 upwardly into the cavity of the handle portion 18 due to the adjusting member's positioning above a center line of the blade 22. Moreover, when the lever 50 is in the blade tensioning position, the lever 50 encloses the adjusting member 54 to prevent inadvertent adjustment of the blade tension.

Figure 17:
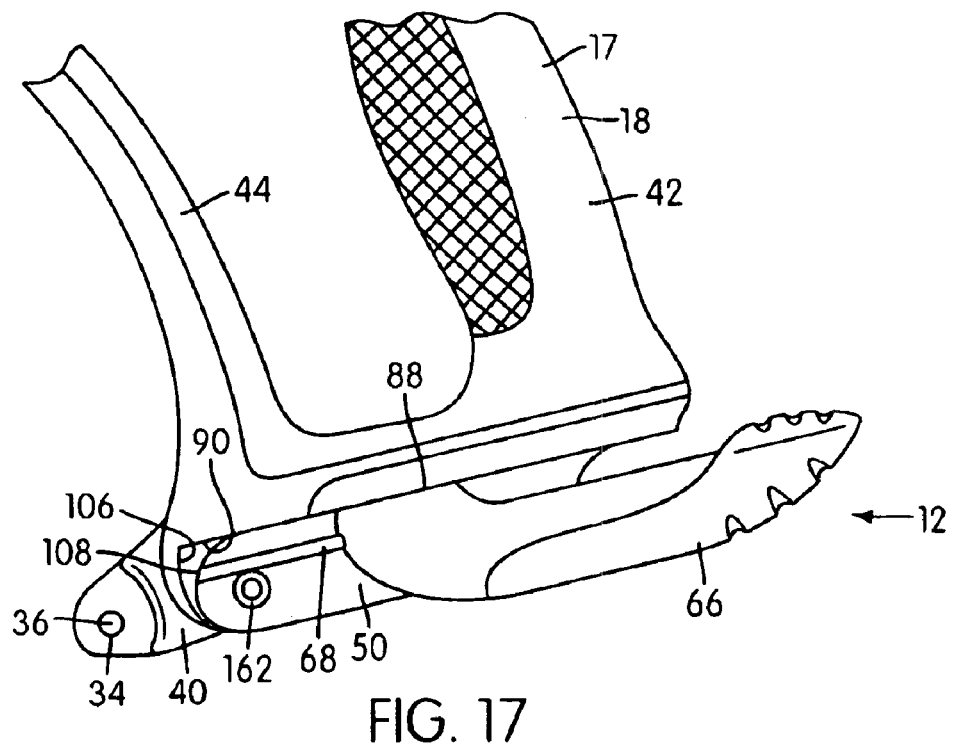
FIG. 17 is a side view of the blade tension adjustment mechanism shown in FIG. 13, the lock of the adjustment mechanism in an unlocked position and the lever in a blade tensioning position.
Figure 18:
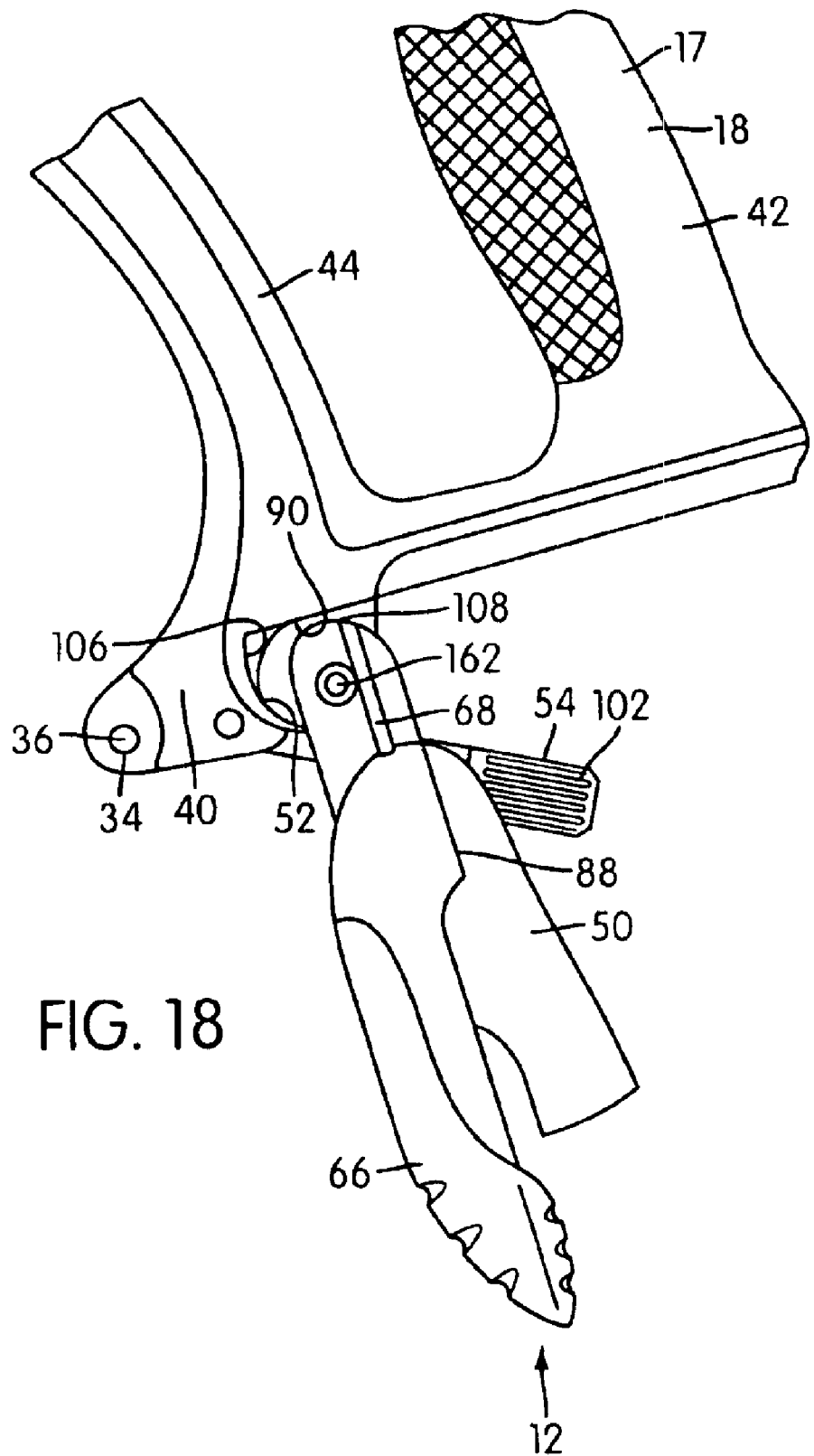
FIG. 18 is a side view of the blade tension adjustment mechanism shown in FIG. 13, the lock of the adjustment mechanism in an unlocked position and the lever in a blade releasing position.

Also, as shown in FIGS. 17–18, the side walls of the adjustment mechanism mounting structure 52 may provide a generally rearwardly facing load bearing surface 106 and the walls 56, 58 of the lever 50 may provide a generally forwardly facing load transmitting surface 108 that is engagable with the load bearing surface 106. In the illustrated embodiment, the load bearing surface 106 has an arcuate, concave configuration and the load transmitting surface 108 has a complementary arcuate, convex configuration. However, it is to be understood that these elements could be reversed or have any other suitable shape. When the lever 50 is moved into the blade tensioning position, the first and second blade mounts 32, 34 are moved relative to one another so as to tension the blade 22 and thereby apply a force to the lever 50. The load bearing and load transmitting surfaces 106, 108 engage one another in an abutting relationship so that at least a portion of the force applied to the lever 50 is transmitted to and borne by the load bearing surface 106, thereby preventing the entire force from being borne by the projection 62/recess 64 connection between the lever 50 and the frame 14. When the lever 50 is moved into the blade releasing position, the first and second blade mounts 32, 34 are moved relative to one another so as to release the tension from the blade 22 and thereby allow blade removal and replacement.

When the lock 66 is moved from the locked position to the unlocked position, the length of the leverage arm utilized to pivot the lever 50 from the blade tensioning position to the blade releasing position is increased. In the illustrated embodiment, when the lock 66 is in the locked position, the lock 66 encloses the lever 50 so that the lock 66 and lever 50 together define a leverage arm of about 70 mm. When the lock 66 is moved to the unlocked position, the lock 66 moves about 30 mm with respect to the lever 50 to extend the length of the leverage arm to about 100 mm. As torque is the cross-product between force and the leverage arm, the force required to pivot the lever 50 to the blade releasing position is reduced due to the increased length of the leverage arm. Thus, the lock 66 not only prevents inadvertent movement of the lever 50 out of its blade tensioning position, but it also facilitates movement of the lever 50 between the blade tensioning and blade releasing positions. The above noted leverage arm dimensions have been provided as an example, and are not intended to be limiting. To the contrary, the lever 50 and lock 66 may be structured to provide any suitable size leverage arm.

As shown in FIG. 1, blade holders 110 are releasably attached to the intermediate portion 20 of the frame 14. The blade holders 110 are structured to releasably secure one or more spare blades to the intermediate portion 20 of the frame 14 for future use by the user.

In the illustrated embodiment, a pair of blade holders 110 are utilized to releasably secure spare blades to the frame 14; one blade holder 110 to releasably secure one end portion of the spare blades and another blade holder 110 to releasably secure the other end portion of the spare blades. However, one blade holder or more than two blade holders may be utilized to releasably secure spare blades to the frame 14.

Figure 19:
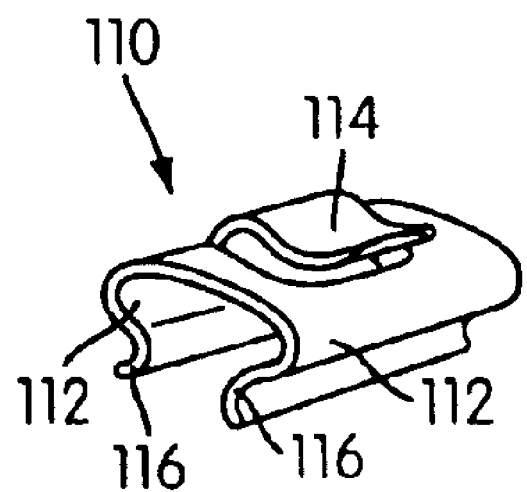
FIG. 19 is a perspective view of an embodiment of a blade holder structured to be attached to the hacksaw shown in FIG. 1.

As shown in FIG. 19, each blade holder 110 is stamped from a piece of sheet metal and deformed in a conventional manner to provide the blade holder 110 with a pair of resilient leg portions 112 and a spring loaded member 114. The leg portions 112 have cam portions 116. The method for securing each blade holder 110 onto the frame 14 is to first laterally align the intermediate portion 20 of the frame 14 between the leg portions 112 of the blade holder 110 and then move the blade holder 110 into engagement with the frame 14. As the intermediate portion 20 of the frame 14 is moved between the leg portions 112, the exterior surface of the frame 14 engages the cam portions 116 so as to flex the resilient leg portions 112 outwardly away from one another, thereby allowing the blade holder 110 to move into a secured position onto the frame 14. Thereafter, the leg portions 112 resiliently return inwardly toward one another with a snap-action to secure the blade member 110 in the secured position. In the illustrated embodiment, the intermediate portion 20 of the frame 14 has an I-beam configuration with the leg portions 112 of the blade holder 110 hugging the upper cross-member of the I-beam to secure the blade member 110 to the frame 14.

In use, the spring loaded members 114 releasably secure one or more spare blades to the intermediate portion 20 of the frame 14. Specifically, the spring loaded member 114 of each blade holder 110 is biased in a direction towards the frame 14 such that spare blades can be clasped between the spring loaded members 114 and the upper surface of the intermediate portion 20 of the frame 14.

The blade holders 110 may be removed if the user chooses not to store spare blades on the hacksaw 10. The blade holders 110 can be removed by pulling the blade holders 110 outwardly away from the frame 14 to flex out the leg portions 112 so as to withdraw the blade holders 110 from the frame 14.

Figure 20:
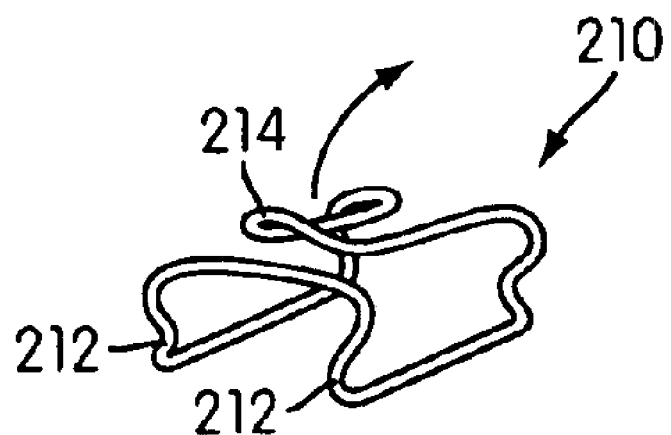
FIG. 20 is a perspective of another embodiment of a blade holder.

FIG. 20 shows another embodiment of a blade holder, indicated as 210. In this embodiment, the blade holder 210 is constructed with spring wire that is folded in a conventional manner to provide the blade holder 210 with leg portions 212 and a spring loaded member 214. The blade holder 210 secures spare blades to the intermediate portion 20 of the frame 14 in a similar manner as the blade holder 110.

Figure 11:
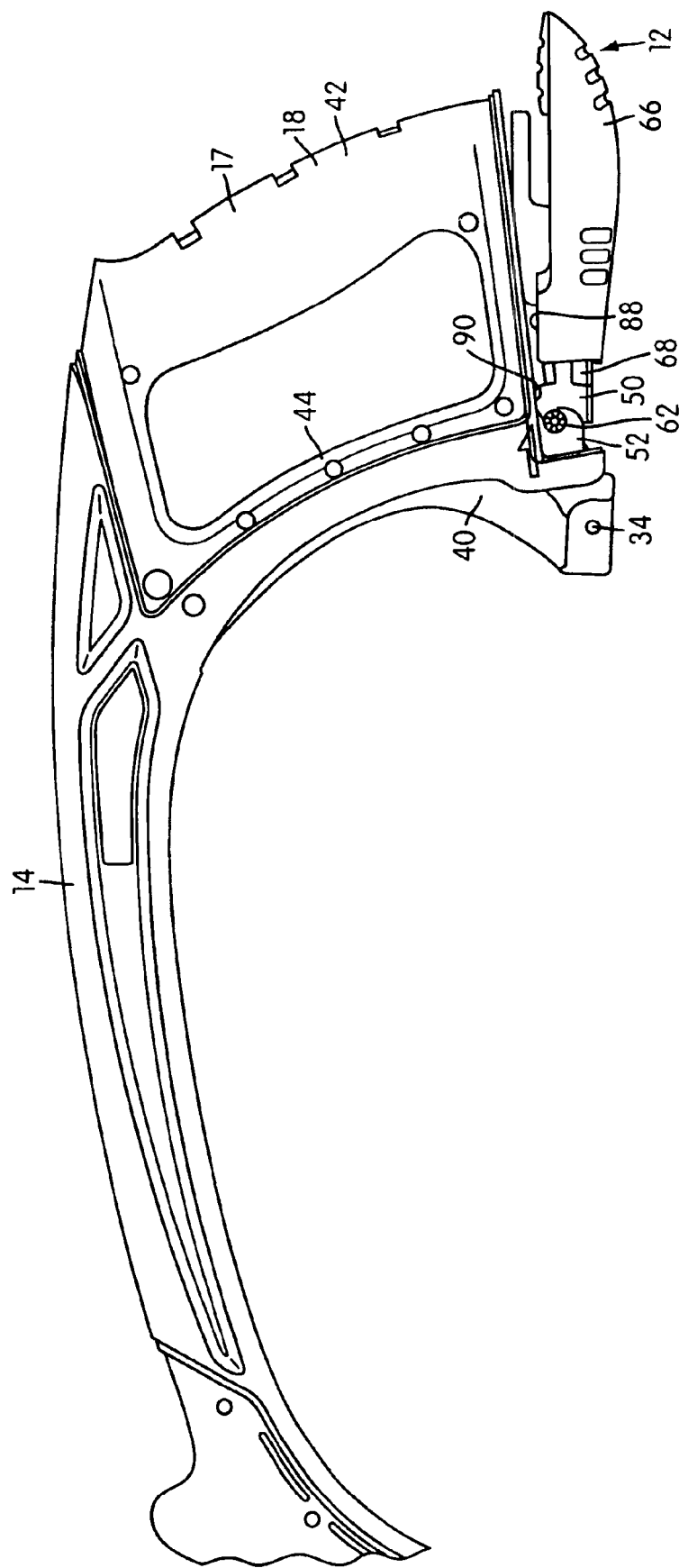
FIG. 11 is a side view of the hacksaw shown in FIG. 1 with portions of the blade tension adjustment mechanism in phantom, the lock of the adjustment mechanism in an unlocked position and the lever in an intermediate position.

Operation of the hacksaw 10 will now be described in greater detail. To mount a blade 22 to the hacksaw 10, the user moves the lock 66 from its locked position (FIGS. 6 and 9) to its unlocked position (FIGS. 7 and 10) by sliding it in a generally rearward direction with respect to the lever 50. The biasing structure 78 positively locates the lock 66 in its unlocked position. This disengages the engagement surfaces 88 of the lock 66 from the engagement surfaces 90 of the handle portion 18 of the frame 14 to allow pivotal movement of the lever 50 and lock 66 with respect to the frame 14. Then, the lever 50 is moved to its blade releasing position by pivoting the same downwardly via the lock 66 attached thereto (FIGS. 8, 11, and 12). The user can then engage opposing longitudinal end portions 24, 26 of the blade 22 with respective first and second blade mounts 32, 34 by inserting the posts 36 through respective apertures 38 in the blade 22.

When the lever 50 is in its blade releasing position, the lever 50 is pivoted relative to the frame 14 so that the knob 102 of the adjusting member 54 is exposed and accessible to the user (FIGS. 8 and 12). If necessary, the user can then turn the knob 102 in an appropriate direction relative to the shaft 92 of the adjusting member 54 to adjust the position of the second blade mount 34 with respect to the lever 50 to thereby selectively adjust the amount of tension that will be applied to the blade 22 when the lever 50 is pivoted back into its blade tensioning position.

The user then pivots the lever 50 upwardly via the lock 66 into its blade tensioning position, which causes relative movement between the first and second blade mounts 32, 34 to affect tensioning of the blade 22. Then, the lock 66 is slid relative to the lever 50 back into its locked position. The biasing structure 78 positively locates the lock 66 in its locked position. In the locked position, the engagement surfaces 88 of the lock 66 are in abutting engagement with the engagement surfaces 90 of the handle portion 18 of the frame 14 to prevent inadvertent pivotal movement of the lever 50 out of its blade tensioning position. With the lever 50 locked into its blade tensioning position, the hacksaw 10 is ready to be used to cut a workpiece.

It can thus be appreciated that the aspects of the present invention have now been fully and effectively accomplished. The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A hacksaw comprising:
   an elongated blade having opposing longitudinal end portions with a cutting edge between the longitudinal end portions;
   a frame including
      a forward portion providing a first blade mount, one of the longitudinal end portions of the blade being removably mounted on the first blade mount,
      a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and
      an intermediate portion interconnecting the forward portion and the rearward portion; and
   a blade tension adjustment mechanism provided at the rearward end portion and including
      a second blade mount pivotally attached to the frame and configured to removably mount the other of the longitudinal end portions of the blade,
      a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade, and
      a lock slidably attached to the lever to slide between (1) a locked position wherein the lock secures the lever in the blade tensioning position, and (2) an unlocked position wherein the lock permits the lever to be pivoted relative to the rearward portion between the blade tensioning position and the blade releasing position wherein the lock pivots with the lever relative to the rearward portion.

2. The hacksaw according to claim 1, wherein the lever includes an adjusting member constructed and arranged to selectively move the second blade mount relative to the lever so as to selectively adjust the amount of tension being applied to the blade when the lever is in the blade tensioning position thereof.

3. The hacksaw according to claim 2, wherein the adjusting member is mounted between the lever and the second blade mount.

4. The hacksaw according to claim 3, wherein the adjusting member includes an elongated shaft having a forward mounting portion and a rearward threaded portion, the mounting portion of the shaft being attached to the second blade mount and threaded portion being slidably engaged with a pin mounted to the lever and threadably engaged with a manually engagable knob, and wherein the knob can be manually rotated to adjust its position on the shaft, which adjusts the position of the pin on the shaft, thereby adjusting the distance between the arm and the lever.

5. The hacksaw according to claim 1, wherein the first and second blade mounts each include a post and the longitudinal end portions of the blade each have an aperture formed therethrough, the blade being removably mounted to the first and second blade mounts by inserting the posts through respective apertures.

6. The hacksaw according to claim 5, wherein the post of the second blade mount is provided on an elongated spring biased arm, the arm having one end pivotally mounted to the frame and an opposite end that provides the post.

7. A hacksaw comprising:
   an elongated blade having opposing longitudinal end portions with a cutting edge between the longitudinal end portions;
   a frame including
      a forward portion providing a first blade mount, one of the longitudinal end portions of the blade being removably mounted on the first blade mount,
      a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and
      an intermediate portion interconnecting the forward portion and the rearward portion; and
   a blade tension adjustment mechanism provided at the rearward end portion and including
      a second blade mount configured to removably mount the other of the longitudinal end portions of the blade, a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade, and a lock slidably attached to the lever to slide between (1) a locked position wherein the lock secures the lever in the blade tensioning position, and (2) an unlocked position wherein the lock permits the lever to be pivoted relative to the rearward portion between the blade tensioning position and the blade releasing position, wherein the lever provides forwardly disposed mounting portions provided with projections and the adjustment mechanism mounting structure includes a pair of recesses, the projections of the lever being pivotally received in the recesses of the adjustment mechanism mounting structure to allow for pivotal movement of the lever with respect to the rearward portion.

8. A hacksaw comprising:

an elongated blade having opposing longitudinal end portions with a cutting edge between the longitudinal end portions;

a frame including a forward portion providing a first blade mount, one of the longitudinal end portions of the blade being removably mounted on the first blade mount, a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and an intermediate portion interconnecting the forward portion and the rearward portion; and a blade tension adjustment mechanism provided at the rearward end portion and including a second blade mount configured to removably mount the other of the longitudinal end portions of the blade, a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade, and a lock slidably attached to the lever to slide between (1) a locked position wherein the lock secures the lever in the blade tensioning position, and (2) an unlocked position wherein the lock permits the lever to be pivoted relative to the rearward portion between the blade tensioning position and the blade releasing position, wherein the lever includes a track portion on opposing side walls and the lock includes an elongated recess on opposing side walls thereof, the track portion of the lever being received within corresponding recesses of the lock to allow the lock to slide along the lever between the locked position and the unlocked position.

9. A hacksaw comprising:

an elongated blade having opposing longitudinal end portions with a cutting edge between the longitudinal end portions;

a frame including a forward portion providing a first blade mount, one of the longitudinal end portions of the blade being removably mounted on the first blade mount, a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and an intermediate portion interconnecting the forward portion and the rearward portion; and a blade tension adjustment mechanism provided at the rearward end portion and including a second blade mount configured to removably mount the other of the longitudinal end portions of the blade, a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade;

a lock slidably attached to the lever to slide between (1) a locked position wherein the lock secures the lever in the blade tensioning position, and (2) an unlocked position wherein the lock permits the lever to be pivoted relative to the rearward portion between the blade tensioning position and the blade releasing position; and a biasing structure mounted between the lever and the lock to positively locate the lock in its locked and unlocked positions.

10. The hacksaw according to claim 9, wherein the biasing structure includes a spring attached to the lever that is operatively engaged with a ball so as to bias the ball into engagement with the lock, the lock including first and second recesses, and wherein the ball is biased into engagement with the lock such that the ball engages within one of the first and second recesses provided in the lock to maintain the lock in the locked position and engages within the other of the first and second recesses provided in the lock to maintain the lock in the unlocked position.

11. A hacksaw comprising:
an elongated blade having opposing longitudinal end portions with a cutting edge between the longitudinal end portions;
a frame including
a forward portion providing a first blade mount, one of the longitudinal end portions of the blade being removably mounted on the first blade mount,
a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and
an intermediate portion interconnecting the forward portion and the rearward portion; and
a blade tension adjustment mechanism provided at the rearward end portion and including
a second blade mount configured to removably mount the other of the longitudinal end portions of the blade,
a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade;
a lock slidably attached to the lever to slide between (1) a locked position wherein the lock secures the lever in the blade tensioning position, and (2) an unlocked position wherein the lock permits the lever to be pivoted relative to the rearward portion between the blade tensioning position and the blade releasing position, wherein the lock includes a generally upwardly facing engagement surface and the rearward portion of the frame includes a generally downwardly facing engagement surface, the engagement surface of the lock being in abutting engagement with the engagement surface of the rearward portion when the lever is in the blade tensioning position and the lock is in the locked position so that pivotal movement of the lever out of the blade tensioning position is prevented because the lock is prevented from movement with respect to the rearward portion, the lock being slidable from the locked position to the unlocked position to disengage the engagement surface of the lock from the engagement surface of the rearward portion to allow pivotal movement of the lever and lock with respect to the rearward portion of the frame.

12. The hacksaw according to claim 1, wherein the adjustment mechanism mounting structure provides a generally rearwardly facing load bearing surface and the lever provides a generally forwardly facing load transmitting surface that is engagable with the load bearing surface, the load bearing and load transmitting surfaces engaging one another in an abutting relationship when the lever is in the blade tensioning position so that at least a portion of the force applied to the lever is transmitted to and borne by the load bearing surface.

13. A hacksaw comprising:
an elongated blade having opposing longitudinal end portions with a cutting edge between the longitudinal end portions;
a frame including
a forward portion providing a first blade mount, one of the longitudinal end portions of the blade being removably mounted on the first blade mount,
a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and
an intermediate portion interconnecting the forward portion and the rearward portion; and
a blade tension adjustment mechanism provided at the rearward end portion and including
a second blade mount configured to removably mount the other of the longitudinal end portions of the blade,
a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade;
a lock slidably attached to the lever to slide between (1) a locked position wherein the lock secures the lever in the blade tensioning position, and (2) an unlocked position wherein the lock permits the lever to be pivoted relative to the rearward portion between the blade tensioning position and the blade releasing position,
wherein a length of a leverage arm utilized to pivot the lever from the blade tensioning position to the blade releasing position is increased when the lock is in the unlocked position so as to facilitate movement of the lever between the blade tensioning and blade releasing positions.

14. A hacksaw comprising:
an elongated blade having opposing longitudinal end portions with a cutting edge between the longitudinal end portions;
a frame including
a forward portion providing a first blade mount, one of the longitudinal end portions of the blade being removably mounted on the first blade mount,
a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and an intermediate portion interconnecting the forward portion and the rearward portion; and a blade tension adjustment mechanism provided at the rearward end portion and including a second blade mount configured to removably mount the other of the longitudinal end portions of the blade, a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade;

a lock slidably attached to the lever to slide between (1) a locked position wherein the lock secures the lever in the blade tensioning position, and (2) an unlocked position wherein the lock permits the lever to be pivoted relative to the rearward portion between the blade tensioning position and the blade releasing position; and a blade holder releasably attached to the intermediate portion of the frame.

15. The hacksaw according to claim 14, wherein a pair of blade holders are utilized to releasably secure spare blades to the frame, one of the pair of blade holders releasably securing one end portion of the spare blades and the other of the pair of blade holders releasably securing the other end portion of the spare blades.

16. The hacksaw according to claim 14, wherein the blade holder includes a pair of resilient leg portions having cam portions, the frame engagable with the cam portions so as to flex the resilient leg portions outwardly away from one another thereby allowing the blade holder to move into a secured position onto the frame, the leg portions resiliently returning inwardly toward one another with a snap-action to secure the blade member in the secured position onto the frame.

17. The hacksaw according to claim 14, wherein the spring loaded member of the blade holder is biased in a direction towards the frame such that spare blades can be clasped between the spring loaded member and the frame.

18. A hacksaw comprising:

an elongated blade having opposing longitudinal end portions with a cutting edge between the longitudinal end portions;

a frame including a forward portion providing a first blade mount, one of the longitudinal end portions of the blade being removably mounted on the first blade mount, a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and an intermediate portion interconnecting the forward portion and the rearward portion;

a blade tension adjustment mechanism mounted to the adjustment mechanism mounting structure of the rearward portion, the blade tension adjustment mechanism providing a second blade mount configured to removably mount the other of the longitudinal end portions of the blade; and a blade holder releasably attached to the intermediate portion of the frame, the blade holder having a spring loaded member structured to releasably secure one or more spare blades to the intermediate portion of the frame, wherein the blade holder includes a pair of resilient leg portions having cam portions, the frame engagable with the cam portions so as to flex the resilient leg portions outwardly away from one another thereby allowing the blade holder to move into a secured position onto the frame, the leg portions resiliently returning inwardly toward one another with a snap-action to secure the blade member in the secured position onto the frame.

19. The hacksaw according to claim 18, wherein the blade tension adjustment mechanism includes a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade.

20. The hacksaw according to claim 19, wherein the blade tension adjustment mechanism includes a lock slidably attached to the lever to slide between (1) a locked position wherein the lock secures the lever in the blade tensioning position, and (2) an unlocked position wherein the lock permits the lever to be pivoted relative to the rearward portion between the blade tensioning position and the blade releasing position.

21. The hacksaw according to claim 20, wherein the lever includes an adjusting member constructed and arranged to selectively move the second blade mount relative to the lever so as to selectively adjust the amount of tension being applied to the blade when the lever is in the blade tensioning position thereof.

22. The hacksaw according to claim 21, wherein the adjusting member is mounted between the lever and the arm.

23. The hacksaw according to claim 22, wherein the adjusting member includes an elongated shaft having a forward mounting portion and a rearward threaded portion, the mounting portion of the shaft being attached to the arm pivotally attached to the frame and threaded portion being slidably engaged with a pin mounted to the lever and threadably engaged with a manually engagable knob, and wherein the knob can be manually rotated to adjust its position on the shaft, which adjusts the position of the pin on the shaft, thereby adjusting the distance between the arm and the lever.

24. The hacksaw according to claim 18, wherein the first and second blade mounts each include a post and the longitudinal end portions of the blade each have an aperture formed therethrough, the blade being removably mounted to the first and second blade mounts by inserting the posts through respective apertures.

25. The hacksaw according to claim 24, wherein the post of the second blade mount is provided on an elongated spring biased arm, the arm having one end pivotally mounted to the frame and an opposite end that provides the post.

26. The hacksaw according to claim 19, wherein the lever provides forwardly disposed mounting portions provided with projections and the adjustment mechanism mounting structure includes a pair of recesses, the projections of the lever being pivotally received in the recesses of the adjustment mechanism mounting structure to allow for pivotal movement of the lever with respect to the rearward portion.

27. The hacksaw according to claim 20, wherein the lever includes a track portion on opposing side walls and the lock includes an elongated recess on opposing side walls thereof, the track portion of the lever being received within corresponding recesses of the lock to allow the lock to slide along the lever between the locked position and the unlocked position.

28. The hacksaw according to claim 20, further comprising a biasing structure mounted between the lever and the lock to positively locate the lock in its locked and unlocked positions.

29. The hacksaw according to claim 28, wherein the biasing structure includes a spring attached to the lever that is operatively engaged with a ball so as to bias the ball into engagement with the lock, the lock including first and second recesses,
and wherein the ball is biased into engagement with the lock such that the ball engages within one of the first and second recesses provided in the lock to maintain the lock in the locked position and engages within the other of the first and second recesses provided in the lock to maintain the lock in the unlocked position.

30. The hacksaw according to claim 20, wherein the lock includes a generally upwardly facing engagement surface and the rearward portion of the frame includes a generally downwardly facing engagement surface, the engagement surface of the lock being in abutting engagement with the engagement surface of the rearward portion when the lever is in the blade tensioning position and the lock is in the locked position so that pivotal movement of the lever out of the blade tensioning position is prevented because the lock is prevented from movement with respect to the rearward portion, the lock being slidable from the locked position to the unlocked position to disengage the engagement surface of the lock from the engagement surface of the rearward portion to allow pivotal movement of the lever and lock with respect to the rearward portion of the frame.

31. The hacksaw according to claim 19, wherein the adjustment mechanism mounting structure provides a generally rearwardly facing load bearing surface and the lever provides a generally forwardly facing load transmitting surface that is engagable with the load bearing surface, the load bearing and load transmitting surfaces engaging one another in an abutting relationship when the lever is in the blade tensioning position so that at least a portion of the force applied to the lever is transmitted to and borne by the load bearing surface.

32. The hacksaw according to claim 20, wherein a length of a leverage arm utilized to pivot the lever from the blade tensioning position to the blade releasing position is increased when the lock is in the unlocked position so as to facilitate movement of the lever between the blade tensioning and blade releasing positions.

33. The hacksaw according to claim 18, wherein a pair of blade holders are utilized to releasably secure spare blades to the frame, one of the pair of blade holders releasably securing one end portion of the spare blades and the other of the pair of blade holders releasably securing the other end portion of the spare blades.

34. The hacksaw according to claim 18, wherein the spring loaded member of the blade holder is biased in a direction towards the frame such that spare blades can be clasped between the spring loaded member and the frame.

35. A hacksaw comprising:
an elongated blade having opposing longitudinal end portions with a cutting edge between the longitudinal end portions;
a frame including
a forward portion providing a first blade mount, one of the longitudinal end portions of the blade being removably mounted on the first blade mount,
a rearward portion including a manually engagable handle portion constructed and arranged to be manually grasped to enable performance of a cutting operation wherein the cutting edge of the blade is engaged with a workpiece and moves forwardly and rearwardly to cut the workpiece, the rearward portion providing an adjustment mechanism mounting structure, and
an intermediate portion interconnecting the forward portion and the rearward portion; and
a blade tension adjustment mechanism provided at the rearward end portion and including
a second blade mount configured to removably mount the other of the longitudinal end portions of the blade,
a lever operatively connected to the second blade mount and pivotally mounted to the adjustment mechanism mounting structure of the rearward portion, the lever constructed and arranged to be pivotally moved between (1) a blade tensioning position wherein the first and second blade mounts are moved relative to one another so as to tension the blade between the first and second blade mounts, and (2) a blade releasing position wherein the first and second blade mounts are moved relative to one another so as to release the tension from the blade and thereby allow removal and replacement of the blade, and
a manually engagable adjusting knob constructed and arranged to selectively move the second blade mount relative to the lever so as to selectively adjust the amount of tension being applied to the blade when the lever is in the blade tensioning position thereof; and
a lock slidably attached to the lever to slide between (1) a locked position wherein the lock secures the lever in the blade tensioning position, and (2) an unlocked position wherein the lock permits the lever to be pivoted relative to the rearward portion between the blade tensioning position and the blade releasing position,
wherein the lever substantially encloses the adjusting member to prevent inadvertent adjustment of the blade tension when the lever is in the blade tensioning position.

36. The hacksaw of claim 35, wherein the manually engagable handle portion may be manually grasped while the lever is moved between the blade tensioning and blade releasing positions.

37. The hacksaw according to claim 14, wherein the blade holder has a spring loaded member structured to releasably secure one or more spare blades to the intermediate portion of the frame.

* * * * *